US012750629B2

(12) United States Patent
Gode et al.

(10) Patent No.: US 12,750,629 B2
(45) Date of Patent: Sep. 29, 2026

(54) VIRTUAL AUDIO AUGMENTATION USING COMPUTER VISION

(71) Applicant: NVIDIA Corporation, Santa Clara, CA (US)

(72) Inventors: Nitin Mahesh Gode, Pune, IN (US); Ashish Anand, Gorakhpur, IN (US); Ambrish Dantrey, Pune, IN (US); Murali Krishna Kamisetty, Pune, IN (US)

(73) Assignee: NVIDIA Corporation, Santa Clara, CA (US)

( * ) Notice: Subject to any disclaimer, the term of this patent is extended or adjusted under 35 U.S.C. 154(b) by 138 days.

(21) Appl. No.: 18/379,582

(22) Filed: Oct. 12, 2023

(65) Prior Publication Data

US 2025/0126429 A1 Apr. 17, 2025

(51) Int. Cl.
*H04S 7/00* (2006.01)
*G06V 40/16* (2022.01)

(52) U.S. Cl.
CPC ............ *H04S 7/303* (2013.01); *G06V 40/168* (2022.01); *H04S 2420/01* (2013.01)

(58) Field of Classification Search
CPC ......... H04S 7/303; G06V 15/22; G06F 17/30; G06F 17/305; G06F 16/66; G06F 16/64; G10L 15/28; G10L 21/00; H04L 29/08; G06Q 50/00; H04M 3/5175; H04M 3/5232; H04R 5/00
USPC .......................................... 381/17, 26, 61, 1
See application file for complete search history.

(56) References Cited

U.S. PATENT DOCUMENTS

| | | | | |
|---|---|---|---|---|
| 11,432,095 | B1 * | 8/2022 | Satongar | H04R 5/02 |
| 2011/0268281 | A1 * | 11/2011 | Florencio | H04S 7/302<br>381/26 |
| 2013/0282388 | A1 * | 10/2013 | Engdegard | G10H 1/0008<br>381/61 |
| 2021/0084429 | A1 * | 3/2021 | Tajik | H04S 7/303 |
| 2024/0098446 | A1 * | 3/2024 | Ninan | G06F 3/012 |

* cited by examiner

*Primary Examiner* — Rasha S Al Aubaidi
(74) *Attorney, Agent, or Firm* — Lowenstein Sandler LLP

(57) ABSTRACT

Disclosed are apparatuses, systems, and techniques that provide virtual immersion sound experience and spatialization effects with an audio device supporting a low number of sound channels, according to at least one embodiment. The techniques include but are not limited to associating input audio channels of an audio stream with virtual speakers, identifying, using an optical sensor, positioning of a user's head relative to the virtual speakers, determining simulated sound intensities at one or more reference locations associated with the user's head, and generating, based on the simulated sound intensities, output audio signals configured for physical speakers.

19 Claims, 5 Drawing Sheets

VIRTUAL AUDIO AUGMENTATION USING COMPUTER VISION

TECHNICAL FIELD

At least one embodiment pertains to systems and techniques for playing multimedia applications. For example, at least one embodiment pertains to techniques for providing high-quality sound immersion experience and spatialization effects without sophisticated and expensive sound delivery hardware.

BACKGROUND

A large and constantly increasing number of sound-playing applications support multi-channel audio that is capable of delivering, via an appropriate high-quality sound system, a superior listening experience to a user. Such applications include, but are not limited to, movie streaming applications, music streaming applications, gaming applications, virtual and augmented reality applications, and the like. A set of speakers positioned around the user can receive individualized audio feeds, and create a sound immersion experience where the user hears sounds arriving from various directions, as if being immersed into the place of action (e.g., a movie scene, a concert hall, a video game setting, etc.). The sound systems capable of creating such effects usually deploy multiple speakers, e.g., a 5.1 channel surround system uses five loudspeakers-a central speaker, front-left/front right speakers, surround-left/right speakers)—and a low frequency speaker (subwoofer). If the user moves relative to the speakers, the distance to various speakers—and, therefore, audible volume of the sound emitted by those speakers changes, further enhancing the on-the-scene immersion illusion, which is being referred to as the spatialization effect herein.

DETAILED DESCRIPTION

Figure 1:
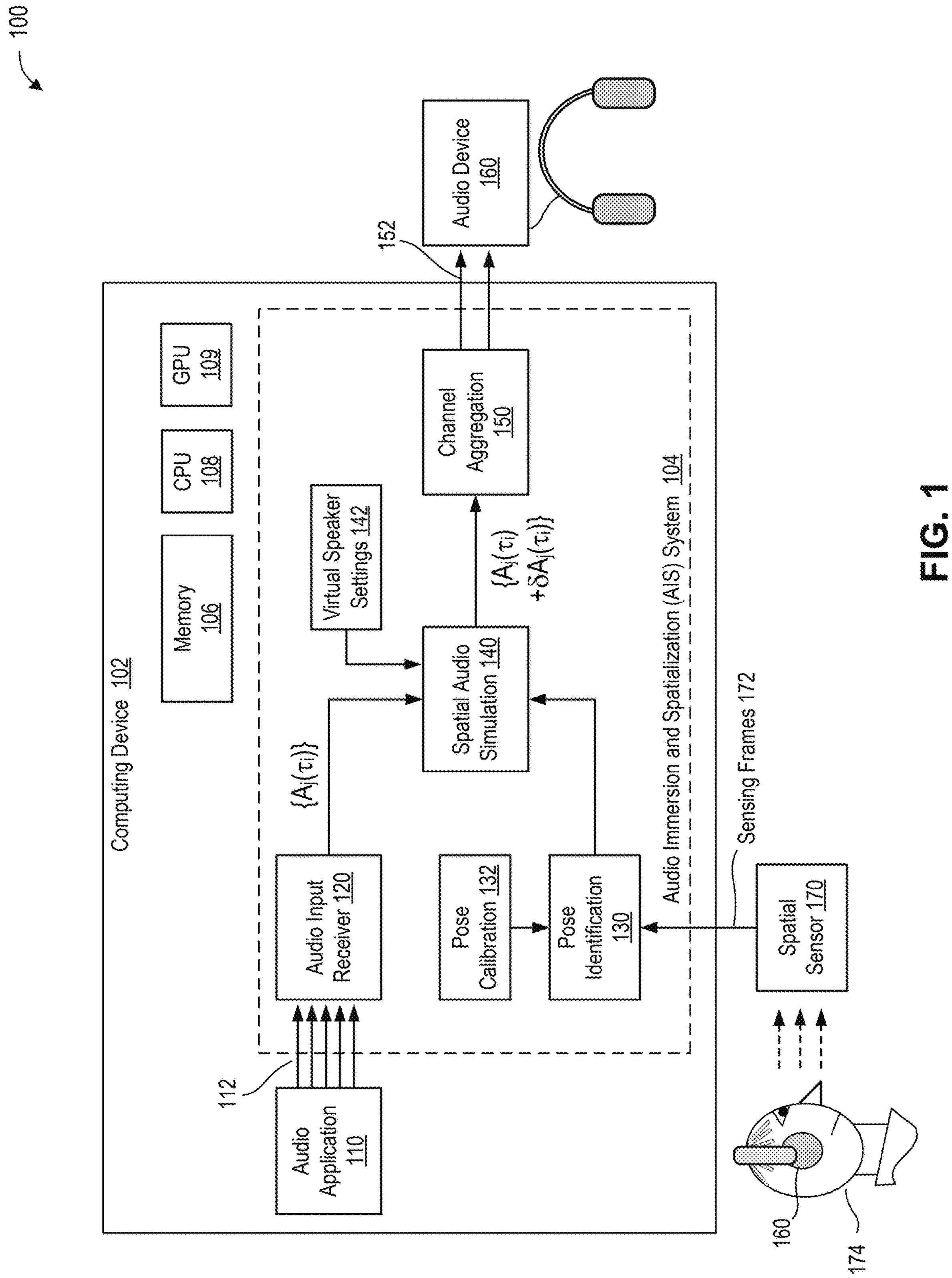
FIG. 1 is a block diagram of an example computing system capable of providing virtual immersion sound experience and spatialization effects using an audio device having a low number of channels, according to at least one embodiment.

Sophisticated sound systems that create immersion, surround, and spatialization effects are typically available in special environments, e.g., movie theaters, home theaters, specialized auditoriums, and the like. In a large number of situations, however, a user can only have a limited audio hardware, e.g., a set of desktop speakers, a pair of headphones, and so on. For example, the user can be traveling, operating from a room that is not equipped with a high-end audio system, e.g., a 5.1 or a 7.1 audio system, or the user may have to maintain a quiet environment, or the user simply cannot afford the high-end system, and so on.

Audio emitted by a typical worn digital audio system, e.g., headphones, is limited to a 90-degree stereo field in a horizontal plane, which provides a rather limited experience compared with the immersion sound systems. Virtual sound systems make it possible to emulate real-world sound (and/or immersion sound systems) without complex multi-speaker setups. Virtual sound (virtual surround) systems attempt to create an immersion perception that there are many more (virtual) sources of sound than the actual physical sources (e.g., headphones), by tricking the human auditory system into thinking that the sound is coming from more numerous virtual sources. Virtual sound systems, however, often fall short of the immersion systems. In particular, most virtual sound systems are not sensitive to user's movements and, therefore, cannot emulate the spatialization effect. Some of the existing virtual sound systems, e.g., Apple AirPods Pro® and MS Hololens® headphones, use accelerometer-based head tracking to address this problem. Such solutions, however, do not generalize to other digital audio systems that lack such specialized hardware support.

Aspects and embodiments of the instant disclosure address these and other technological challenges by disclosing methods and systems that provide virtual immersion sound experience and spatialization without expensive complex hardware. Similarly, no specialized proprietary audio format is required as the disclosed techniques may operate on most conventional computing devices. In some embodiments, head tracking may be performed using a web camera, which is a staple component of most modern computers, including desktop computers, laptop computers, tablets, smart phones, and so on. The disclosed techniques may operate with any suitable audio application (e.g., music, movie, gaming, etc.) that generates an audio stream having any number of channels, e.g., X.1 (X+1) channels (including but not limited to 5.1 channels, 7.1 channels, 9.1 channels, and/or the like). An audio immersion and spatialization (AIS) system operating in accordance with the disclosed techniques may include an audio receiving module, which may represent (spoof) to the audio application that the audio hardware available to the AIS system includes a multi-channel surround system capable of supporting a corresponding number of channels. The AIS system may, therefore, receive a full X+1-channel audio input and assign the received input channels to X+1 virtual speakers (e.g., X virtual loudspeakers and 1 virtual low-frequency subwoofer). The AIS system may further assign positions to various virtual speakers, which may be default positions or positions that are defined and/or adjusted by the user. The AIS system may include a computer vision module that tracks (e.g., with the help of a web camera) a motion of the user's head. In some embodiments, tracking the user's head may include determining a bounding box for the user's head. For example, the bounding box may be tracked by identifying translational coordinates of the bounding box (e.g., coordinates of a center of mass of the bounding box) together with angles of rotation of the bounding box, as functions of time. In some embodiments, e.g., where precise determination of the bounding box may be difficult (e.g., caused by an elaborate haircut or hat that may be difficult to detect), tracking the user's head may include identifying location of some other representative features, e.g., user's eyes, nose, chin, mustache, or even locations of headphones.

The results of the head tracking may be used to determine distances from the virtual speakers to some reference locations of the user's head, such as locations of the user's ears. To improve performance (especially in the higher range of the audible spectrum), directions from the virtual speakers to the reference locations of the user's head may also be determined. Based on the determined distances and directions, the AIS system may compute simulated sound intensities at the user's ears (or other reference locations). The simulated intensities may be computed using realistic speaker radiances (corresponding to a type of the virtual speakers) in view of the audio stream data received from the audio application and a volume (and/or other settings) specified by the user. The simulated intensities at the reference locations may then be aggregated and converted into output audio signals for the actual physical speakers, e.g., for the left and right headphones worn by the user. As the user's head moves, the computed output audio signals change thus taking into account changes in the relative positioning of the user's head and the virtual speakers and implementing the spatialization effect.

The advantages of the disclosed techniques include but are not limited to realization of virtual sound immersion and spatialization without specialized high-end hardware and facilitated by devices (e.g., web cameras) that are commonly found in typical computing devices. The disclosed techniques do not require any special formats of audio data and may be implemented using software that can be instantiated on any suitable platform, type of a computing device, and/or operating system.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

FIG. 1 is a block diagram of an example computing system 100 capable of providing virtual immersion sound experience and spatialization effects using an audio device having a low number of channels, according to at least one embodiment. As depicted in FIG. 1, computing system 100 may include a computing device 102 and an audio device 160 communicating with computing device 102 over any type of wired or wireless connection. Audio device 160 may have a low number of channels. For example, audio device 160 may be (or include) a stereo audio device capable of receiving two channels, such as headphones, earbuds, or any other suitable audio device wearable by a user 174. In some embodiments, audio device 160 may be (or include) desktop speakers, e.g., stereo speakers mounted on or near computing device 102. Computing device 102 may receive an input audio stream 112 produced by an audio application 110. Audio application 110 may include a music playback application, a movie application, a video application, a gaming application, a simulation application (e.g., a flying simulator), or any other suitable application that provides audio feed as the main output (e.g., a music streaming application) or as one of multiple outputs (e.g., an audio feed in addition to a video stream).

Audio application 110 may be a cloud-based application supported by an external computing device (e.g., a streaming services server, a gaming server, and/or the like), which may be communicating with computing device 102 over any suitable network, including but not limited to a public network (e.g., the Internet), a private network (e.g., a local area network (LAN), or wide area network (WAN)), a wireless network, a personal area network (PAN), some combination thereof, and/or another network type. In some embodiments, audio application 110 may be an application running on computing device 102, e.g., a multimedia player playing an audio (video, or any other multimedia) file stored or loaded locally on computing device 102.

Input audio stream 112 may be in a surround sound X.1 format, Dolby Atmos® format, Dolby® Digital Plus format, Digital Theater Sound (DTS) format, THX format, Blu Ray® format, or in any other suitable format. In some embodiments, e.g., embodiments that use one of the X.1 formats, input audio stream 112 may include X+1 channels with various channels providing audio inputs for respective X+1 speakers, e.g., X loudspeakers and 1 low-frequency subwoofer. In some embodiments, e.g., embodiments that use Dolby Atmos format, input audio stream 112 may include a number of tracks, e.g., up to 128 tracks, with some of the tracks assigned directly to specific speakers and some of the tracks associated with virtual audio objects that may be rendered by multiple speakers. In embodiments, any additional formats of input audio stream 112 may be used. Input audio stream 112 may further audio metadata, e.g., locations of moving virtual audio objects, data encoding type, intensity, and volume of the audio tracks.

Input audio stream 112 may be received by an AIS system 104 that implements techniques of the instant disclosure. AIS system 104 may include an audio input receiver 120, which may represent (spoof) to audio application 110 that the audio hardware accessible to computing device 102 includes a multi-channel surround system (or a similar system) capable of supporting multiple input audio channels. Consequently, audio input receiver 120 receives, with input audio stream 112, multi-channel audio samples denoted schematically as $A_j(\tau_i)$, where j enumerates channels (e.g., j=1 . . . X+1) and $\tau_i$ enumerates a sequence of timestamps. To receive a multi-channel input audio stream 112 capable of providing immersion and/or spatialization effects, audio input receiver 120 may register, with audio application 110, a virtual audio device (e.g., a spoofing X.1 audio device) rather than the actual audio device 160. This causes audio application 110 to provide a higher-quality input audio stream 112 than would have otherwise been provided had the actual audio device 160 been registered with audio application 110.

AIS system 104 may forward the received set (time series) of high-quality multi-channel audio samples $\{A_j(\tau_i)\}$ to a spatial audio simulation module 140, which may modify, as described in more detail below, the received audio samples. Spatial audio simulation module 140 may further use additional data provided by a pose identification module 130, as described below.

Pose identification module 130 may receive data from a spatial sensor 170, which may include a web camera, e.g., any camera that is built-in into computing device 102 or communicatively coupled to computing device 102 over a suitable link or connection, such as a wired connection (e.g., a USB connection, an HDMI connection, and/or the like), a wireless connection (e.g., a PAN connection, a WLAN connection, and/or the like), or a combination thereof. In some embodiments, spatial sensor 170 may include a camera that detects light in the visible part of the electromagnetic spectrum, 380-700 nm. In some embodiments, spatial sensor 170 may include a camera that operates in a part of the electromagnetic spectrum that is not naturally visible to human perception, such as a portion of the infrared spectrum, e.g., 750-1100 nm, or some other range of wavelengths. In some embodiments, spatial sensor 170 may include a source of IR radiation, e.g., a pulsed source. Spatial sensor 170 may provide a real-time stream of sensing (e.g., image or video) frames 172 depicting a portion of an environment of computing device 102 where user 174 may be located. The sensing frames 172 may be used by pose identification module 130 to determine position and orientation (pose) of the user's head. Pose may be characterized by any suitable set of variables, e.g., three-dimensional coordinates of some central point associated with the head, $\vec{R}=(X, Y, Z)$, and a set of angles $\{\theta_k\}$, e.g., one angle $\theta_1$ specifying a tilt of the head away from the vertical direction, another angle $\theta_2$ a specifying azimuthal rotation of the head around the vertical direction, and yet another angle $\theta_3$ specifying a degree of turning of the head around its own axis. In some embodiments, any other equivalent or similar sets of variables may be used, e.g., a set of transformation matrices characterizing transformation of pose from some reference pose (such as user's head being in an upright position in front of spatial sensor 170).

Figure 2A:
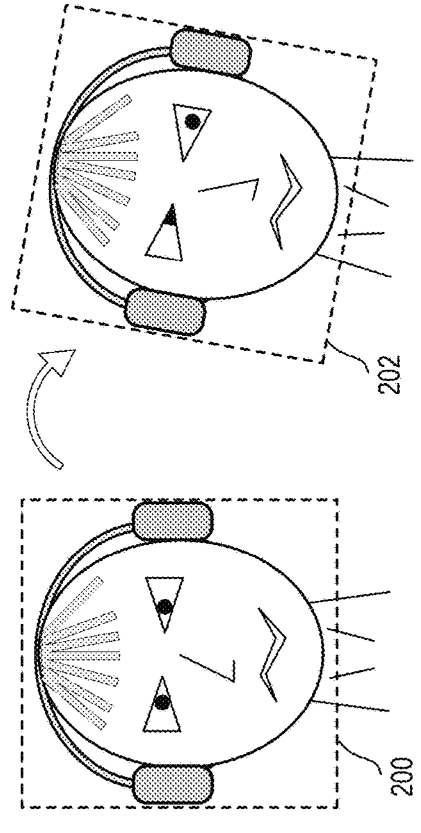
FIGS. 2A-2D illustrate identification of a pose of a user's head, according to various embodiments.
Figure 2B:
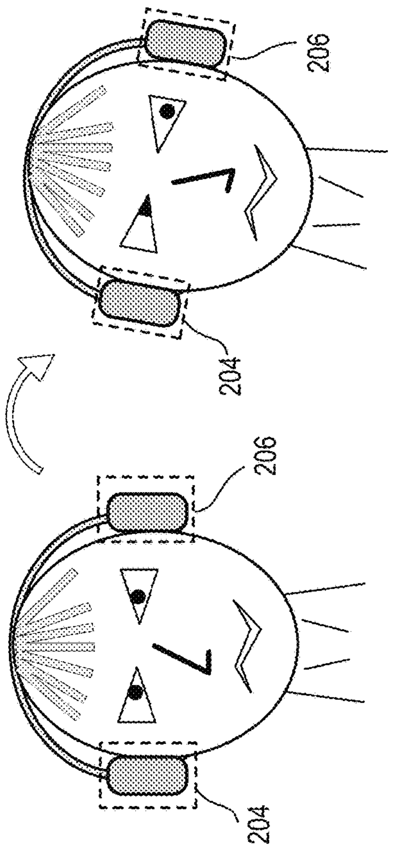
Figure 2C:
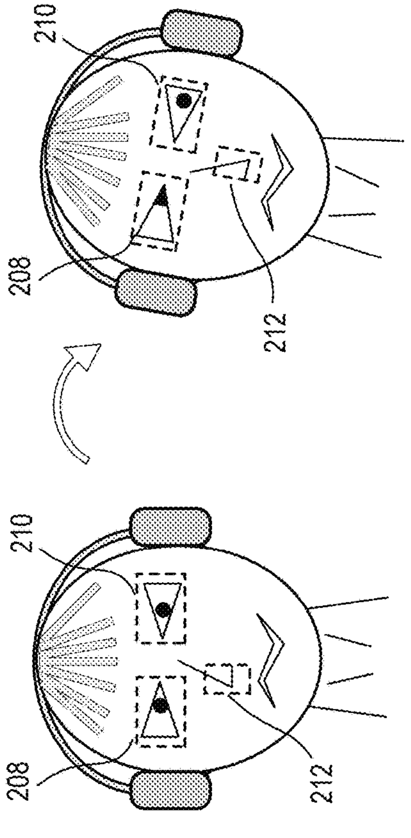
Figure 2D:
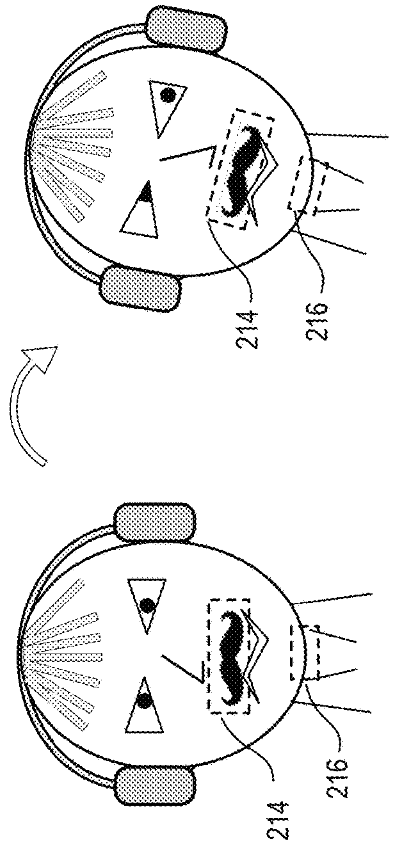

Pose identification module 130 may use any suitable set of computer-vision techniques to determine a current pose of the user's head. Computer-vision techniques may include, but are not limited to, machine learning models (including neural network models), landmark detection models, bounding box detection models, and/or any other computer vision techniques. FIGS. 2A-2D illustrate identification of a pose of the user's head, according to various embodiments. FIG. 2A illustrates identification of a bounding box for the user's head, according to at least one embodiment. As shown in FIG. 2A, pose identification module 130 may capture the head's depiction in a particular sensing frame 172. A rectangular bounding box 200 may be drawn around the user's head. As the head moves, bounding box 200 is moved to a new position 202 maintaining capture of the user's head. Vertical and horizontal positioning of bounding box 200 may identify head motions within the plane of the sensing frame(s) 172. Changes in the aspect ratio of bounding box 200 may identify rotations of the head around the vertical axis. Changes in the size of bounding box 200 may identify distance (depth) of the head to spatial sensor 170. These observed changes may be converted to a suitable set of variables, e.g., $\vec{R}$, $\{\theta_k\}$, that define the current pose of the user's head. In some embodiments, pose identification may be performed using a number of landmarks. In particular, FIG. 2B illustrates pose identification using locations (e.g., bounding boxes) 204 and 206 of the user's headphones as landmarks. FIG. 2C illustrates pose identification using eyes 208 and 210 and nose 212 as landmarks. FIG. 2D illustrates pose identification using mustache 214 and chin 216 as landmarks. Various other landmarks (e.g., face-specific prominent landmarks) may be used for pose identification. In some embodiments, landmarks may be identified using a pose calibration stage 132, which may include a set of calibration procedures individually performed for a particular user 174. For example, during pose calibration procedures, pose calibration stage 132 may prompt user 174 to look straight into a screen of computing device 102 (or spatial sensor 170), to the right of the screen, to the left of the screen, towards one or more objects displayed on the screen, and so on. Based on the captured calibration images, pose calibration stage 132 may identify and select a number of prominent landmarks that maximize accuracy and reliability of pose identification. The identified landmarks may subsequently be used at runtime operation of AIS system 104. Pose identification module 130 may also track the pose as a function of time, e.g., a new pose may be identified for each new sensing frame 172 or for each set of N sensing frames 172. In some embodiments, pose tracking may be performed using a Kalman filter or any other similar filtering technique that improves accuracy of pose tracking. In some embodiments, tracking may be used for anticipating where the user's head is going to be at some time in the future (e.g., a fraction of a second) to precisely time the audio delivered to user 174 as the user's head arrives at this location.

Figure 3:
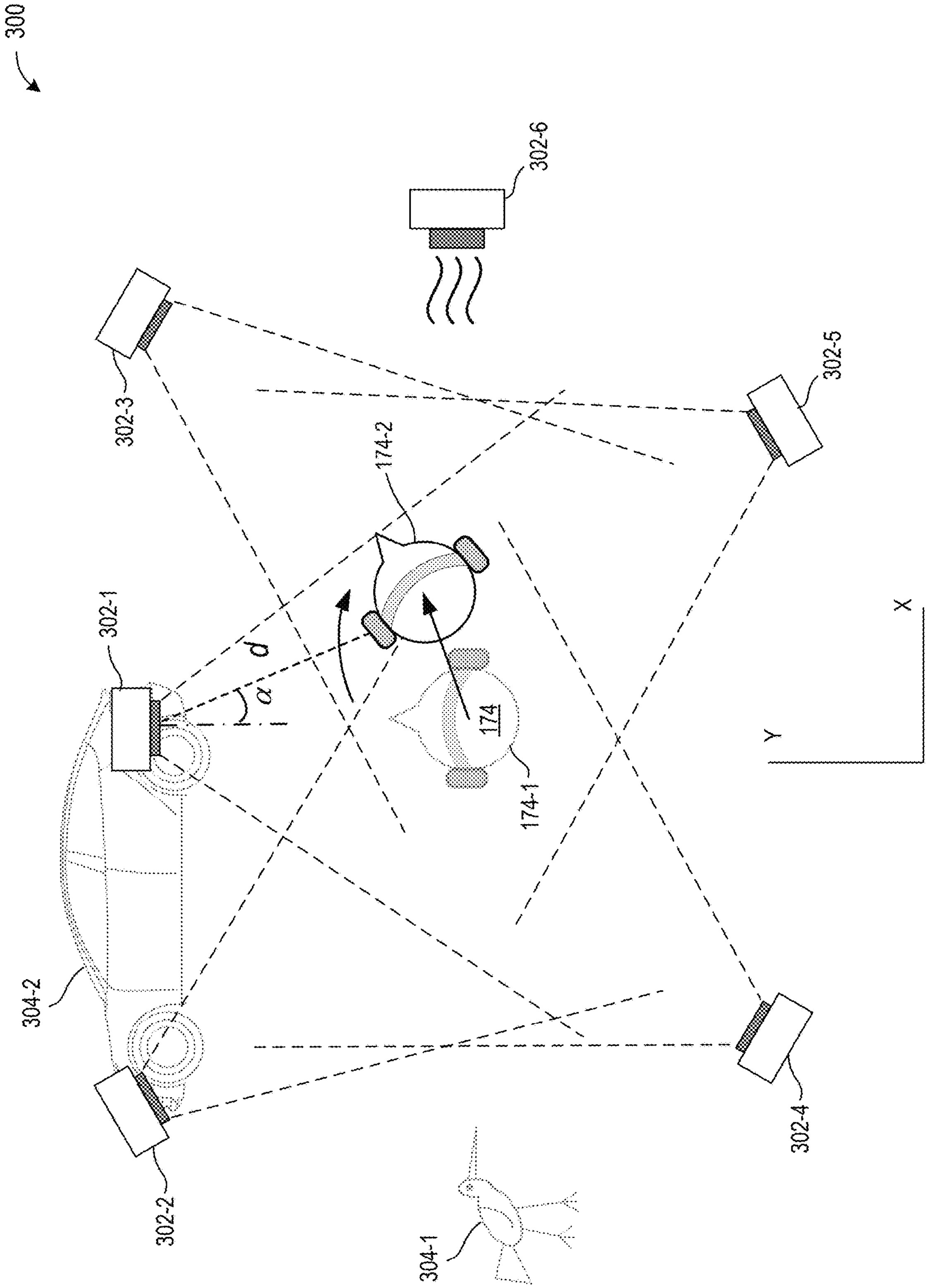
FIG. 3 illustrates spatial audio simulation that emulates immersion and spatialization effects, according to at least one embodiment.

The identified variables $\vec{R}$, $\{\theta_k\}$(or some other set of variables) may be provided to spatial audio simulation module 140. Spatial audio simulation module 140 may create virtual audio objects. Some of the virtual objects may correspond to virtual speakers. FIG. 3 illustrates spatial audio simulation 300 that emulates immersion and spatialization effects, according to at least one embodiment. In particular, spatial audio simulation 300 may position virtual speakers 302-*j* around user 174, such as (as shown) virtual central speaker 302-1, virtual front-left speaker 302-2, virtual front-right speaker 302-3, virtual surround-left speaker 302-4, virtual surround-right speaker 302-5, and a virtual subwoofer 302-6. In some embodiments, virtual speakers 302-*j* may be placed at some default locations, e.g., relative to the screen of computing device 102, or relative to some default user's position in front of the screen. In some embodiments, locations of virtual speakers 302-*j* may be adjustable by user 174, e.g., via virtual speaker settings module 142. For example, virtual speaker settings module 142 may display to user 174 default (or previously stored) locations of virtual speakers 302-*j* and user 174 may change those default (or previously stored) locations, e.g., by moving depictions of virtual speakers 302-*j* using a keyboard, a mouse, a touchscreen, a microphone, and/or any other interface or pointing device. Some of audio samples $A_j(\tau_i)$ received via audio input receiver 120 may include audio feed directed to respective virtual speakers 302-*j*. For example, audio samples $A_1(\tau_i)$ may be directed to virtual central speaker 302-1, audio samples $A_2(\tau_i)$ may be directed to virtual front-left speaker 302-2, and so on. Additionally, some of audio samples $A_j(\tau_i)$ may be directed to virtual objects 304-*j* whose audio output is produced by multiple virtual audio speakers. Virtual objects may include any number of small objects located between speakers 302-*j*, e.g., a bird 304-1. Virtual objects 304-*j* may also include any number of large objects producing a sound with a wide front of propagation, e.g., a vehicle 304-2. Audio samples associated with virtual object channels may be represented via a combination (e.g., superposition) of multiple speakers 302-*j* (including, in some instances, all speakers 302-*j*). Virtual speakers 302-*j* and virtual objects 304-*j* may be located anywhere within a two-dimensional (e.g., horizontal) plane. Is some embodiments, virtual speakers 302-*j* and virtual objects 304-*j* may be located anywhere within the three-dimensional space, including above and below user 174.

Pose of the user's head determined by pose identification module 130 may be used to compute distances from virtual speakers and virtual objects to some reference location(s) of the user's head. In some embodiments, the reference locations may include a geometric center of the user's head, e.g., a geometric center (a center of mass) of the bounding box for the user's head. In some embodiments, the reference locations may include locations of the user's ears (or headphones). Accordingly, two separate distances may be computed, e.g., for each of the ears (or headphones). For example, as illustrated in FIG. 3, a distance d from central speaker 302-1 to the left ear of user 174 may be computed. Likewise, a distance from central speaker 302-1 to the right ear of user 174 may be computed. Similarly, distances from other speakers and various virtual objects to both ears of user 174 may be computed. In some embodiments, directions from various speakers and virtual objects to the reference locations of the user's head may further be determined. For example, computed angle $\alpha$ may indicate a direction that the line of sight from virtual central speaker 302-1 towards the left ear of user 174 makes with the normal direction of a membrane of virtual central speaker 302-1. Although one in-plane angle $\alpha$ is illustrated in FIG. 3 for brevity and conciseness, a second angle may similarly be computed, e.g., angle $\beta$ that indicates at which angular elevation (above or below the respective virtual speaker or virtual object) the reference location of the user's head is positioned relative to virtual central speaker 302-1.

As user 174 moves, distances and/or directions to various virtual speakers/objects change. For example, distances and/or directions from various virtual speakers 302-1 . . . 302-6 and virtual objects 304-1, 304-2, etc., may be different at a first user's position 174-1 than at a second user's position 174-2. To account for such a change in position, spatial audio simulation module 140 may modify audio samples according to the current position of the user. For example, an audio sample for jth audio channel at time stamp $\phi_i$ may be modified using the following equation:

$$A_j(\tau_i) \to A_j(\tau_i) + \delta A_j\left(\vec{R}_i, \{\theta_k\}_i\right),$$

in view of pose $\vec{R}_i$, $\{\theta_k\}_i$ at the respective time stamp, where $A_j(\tau_i)$ may be an audio sample for some reference position of the user's head, e.g., position 174-1 or any other position, e.g., selected during calibration. For example, if the current pose $\vec{R}_i$, $\{\theta_k\}_i$ brings the user's head closer to (farther away from) jth virtual speaker or virtual object compared with the reference position, the corresponding correction $\delta A_j$ may be positive (or negative). Similarly, if the current pose brings the user's head closer to (farther away from) the normal direction of jth virtual speaker, the corresponding correction $\delta A_j$ may be positive (negative).

In some embodiments, individual virtual speakers may be characterized by acoustic radiance $I(\alpha, \beta)$, e.g., the power of sound energy emitted along a particular direction characterized by angles $\alpha$, $\beta$. In some embodiments, the emitted power may then be reduced based on the distance d to the respective speaker. Correspondingly, the modification of the audio samples $\delta A_j$ may be computed using acoustic radiance $I(\alpha, \beta)$ that is modeled after specific realistic speakers. This achieves simulation of a real-world three-dimensional audio environment and facilitates providing audio immersion experience and spatialization effect to user 174. IN some embodiments, acoustic radiance $I(\alpha, \beta, \nu)$ of various speakers may be frequency-dependent and computed for a range of acoustic frequencies $\nu$. For example, acoustic radiance $I(\alpha, \beta, \nu)$ at higher frequencies $\nu$ may be focused more near the normal direction (e.g., small angles $\alpha$, $\beta$) than acoustic radiance at lower frequencies.

Referring back to FIG. 1, the modified audio samples $A_j(\tau_i)+\delta A_j(\vec{R}_i, \{\theta_k\}_i)$ may be used by a channel aggregation stage 150 to generate output signals 152. A number of output channels 150 may be determined by a number of speakers of audio device 160. More specifically, the modified audio samples may be aggregated and converted into output audio signals 152 for the actual physical speakers, e.g., for the left and right headphones of audio device 160. The output signals 152 may be in Windows Sonic®, Dolby Atmos®, DTS, and or any other suitable audio format.

In at least one embodiment, various operations of example computing system 100 disclosed herein (and/or any additional operations) may be supported by a memory device 106, e.g., to store instructions, audio samples, metadata, and the like. Various operations of example computing system 100 may be executed by one or more central processing units (CPUs) 108, one or more graphics processing units (GPUs) 109, and/or other parallel processing units (PPUs) or accelerators, including a deep learning accelerator, a data processing unit (DPU), and the like.

Figure 4:
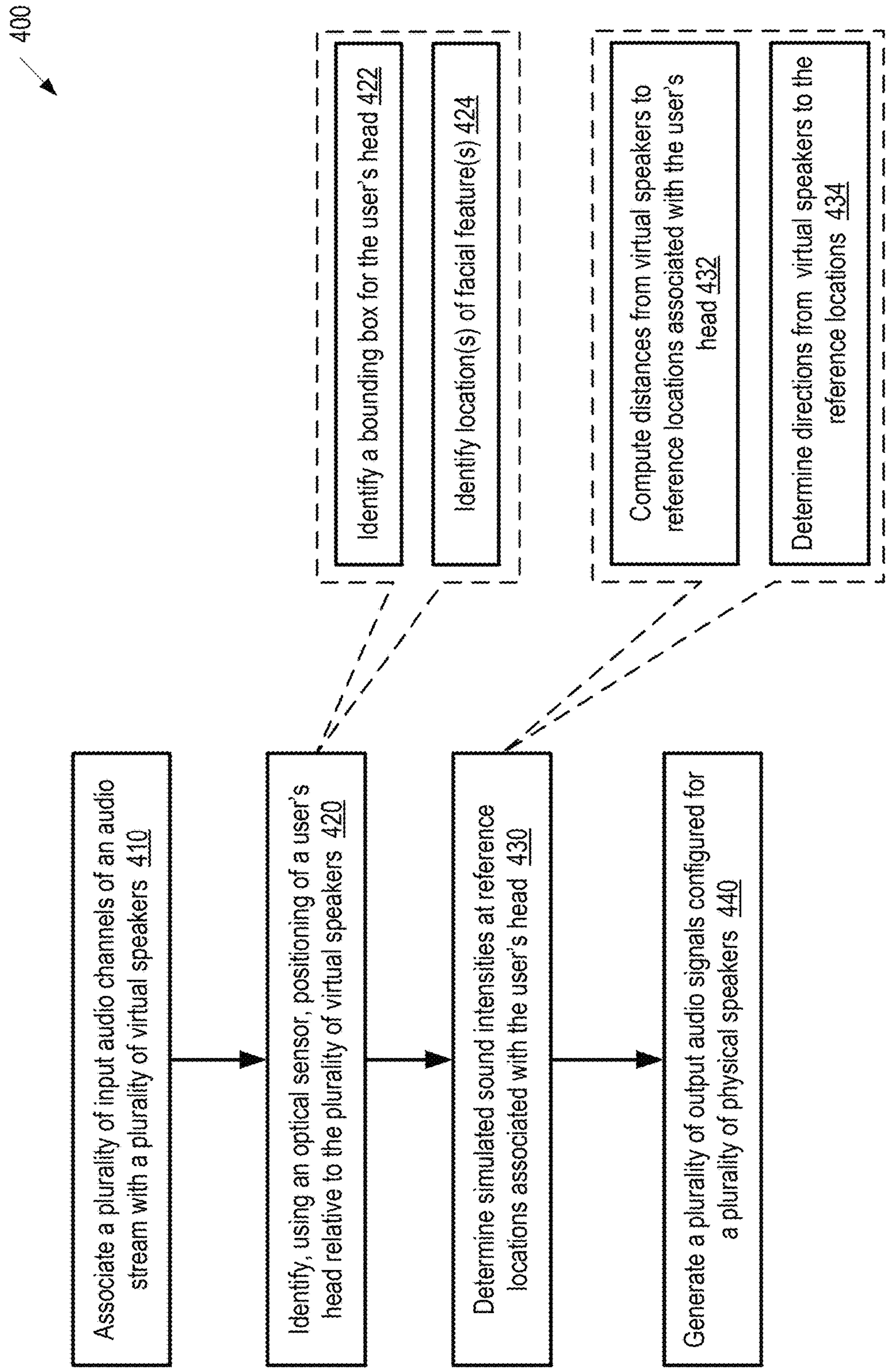
FIG. 4 is a flow diagram of an example method of implementing virtual immersion sound experience and spatialization effects using an audio device with a low number of sound channels, according to at least one embodiment.

FIG. 4 is a flow diagram of an example method 400 of implementing virtual immersion sound experience and spatialization effects using an audio device with a low number of sound channels, according to at least one embodiment. Method 400 may be performed in the context of autonomous driving applications, industrial control applications, provisioning of streaming services, video monitoring services, computer-vision based services, artificial intelligence and machine learning services, mapping services, gaming services, virtual reality or augmented reality services, and many other contexts, and/or in systems and applications for providing one or more of the aforementioned services. Method 400 may be performed using one or more processing units (e.g., CPU 108, GPUs 109 accelerators, PPUs, DPUs, etc.), which may include (or communicate with) one or more memory devices (e.g. memory device 106). In at least one embodiment, method 400 may be performed using AIS system 104 of FIG. 1. In at least one embodiment, processing units performing method 400 may be executing instructions stored on a non-transient computer-readable storage media. In at least one embodiment, method 400 may be performed using multiple processing threads (e.g., CPU threads and/or GPU threads), individual threads executing one or more individual functions, routines, subroutines, or operations of method 400. In at least one embodiment, processing threads implementing method 400 may be synchronized (e.g., using semaphores, critical sections, and/or other thread synchronization mechanisms). Alternatively, processing threads implementing method 400 may be executed asynchronously with respect to each other. Various operations of method 400 may be performed in a different order compared with the order shown in FIG. 4. Some operations of method 400 may be performed concurrently with other operations. In at least one embodiment, one or more operations shown in FIG. 4 may not always be performed.

At block 410, method 400 may include associating a plurality of input audio channels (e.g., input audio channels 112) of an audio stream with a plurality of virtual speakers. The audio stream may be received from any suitable network and/or local audio application (e.g. audio application 110). "Audio applications" are not limited to applications that provide only audio data and may include applications that stream (or otherwise provide) an audio data in addition to any other data, e.g., a video data, a metadata, and/or any other additional data. For example, the audio stream may be associated with at least a music streaming application, a video streaming application, a gaming application, a virtual reality application, an augmented reality application and/or any combination thereof. Gaming applications may include applications that are fully or partially provided via cloud-based services, e.g., NVIDIA GeForce® Now cloud-based applications including applications capable of delivering audio and video feedback together with haptic feedback. Virtual reality and/or augmented reality applications may include NVIDIA CloudXR applications similarly capable of providing haptic feedback to a user. In some embodiments, some of the plurality of input audio channels may be intended for specific virtual audio speakers. For example, the plurality of input audio channels may include a central input audio channel (e.g., virtual audio speaker 302-1 in FIG. 3), one or more side input audio channels (e.g., virtual audio speakers 302-2 and 302-3 in FIG. 3), and one or more surround input audio channels (e.g., virtual audio speakers 302-1 and 302-5 in FIG. 3). In some embodiments, at least one audio channel may be associated with two or more speakers. For example, an audio channel associated with a virtual object (e.g., bird) 304-1 may be associated with virtual audio speakers 302-2 and 302-4 in FIG. 3, and a virtual object (vehicle) 304-2 may be associated with (at least) virtual audio speakers 302-1 and 302-2 in FIG. 3. In some embodiments, locations of the plurality of virtual speakers may be user-adjustable.

At block 420, method 400 may continue with identifying, using an optical sensor, positioning of a user's head relative to the plurality of virtual speakers. The term "optical" should be understood to include any electromagnetic sensor, not only sensors operating in the visible part of the electromagnetic spectrum. In some embodiments, the optical sensor may include a visible range camera (e.g., a web camera), an infrared camera, and/or any combination thereof. An optical sensor may include a charge-coupled device (CCD) sensor, a complementary metal-oxide semiconductor (CMOS) sensor, or any other electromagnetic sensor. As illustrated with the top callout portion of FIG. 4, identifying positioning of the user's head may include, at block 422, identifying a bounding box for the user's head (e.g., as described in conjunction with FIG. 2A). In some embodiments, identifying the bounding box may include identifying one or more translational coordinates of the bounding box and one or more angles of rotation of the bounding box (e.g., relative to any suitable reference positioning of the bounding box). In some embodiments, identifying positioning of the user's head may include identifying locations of one or more facial features (e.g., as described in conjunction with FIGS. 2C-2D). In some embodiments, identifying positioning of the user's head may include identifying locations of the user's headphones (e.g., as described in conjunction with FIG. 2B).

At block 430, method 400 may include determining a plurality of simulated sound intensities at one or more reference locations associated with the user's head. In some embodiments, the one or more reference locations associated with the user's head may include locations of the user's ears estimated using the identified positioning of the user's head. In some embodiments, the one or more reference locations associated with the user's head may be outside the user's head (or outside the bounding box for the user's head). The simulated sound intensities may be associated with the plurality of virtual speakers. In some embodiments, individual simulated sound intensities of the plurality of simulated sound intensities may be determined for multiple acoustic frequencies (e.g., a continuous range of audible frequencies). As illustrated with the bottom callout portion of FIG. 4, determining the plurality of simulated sound intensities may include, at block 432, computing distances from the plurality of virtual speakers to the one or more reference locations associated with the user's head. In some embodiments, determining the plurality of simulated sound intensities may include, at block 434, determining directions from the plurality of virtual speakers to the one or more reference locations associated with the user's head.

At block 440, method 400 may continue with generating, based on the plurality of sound intensities, a plurality of output audio signals configured for a plurality of physical speakers (e.g. audio device 160 in FIG. 1). In some embodiments, the physical speakers may include user's headphones. In some embodiments, the physical speakers may include desktop speakers.

Figure 5:
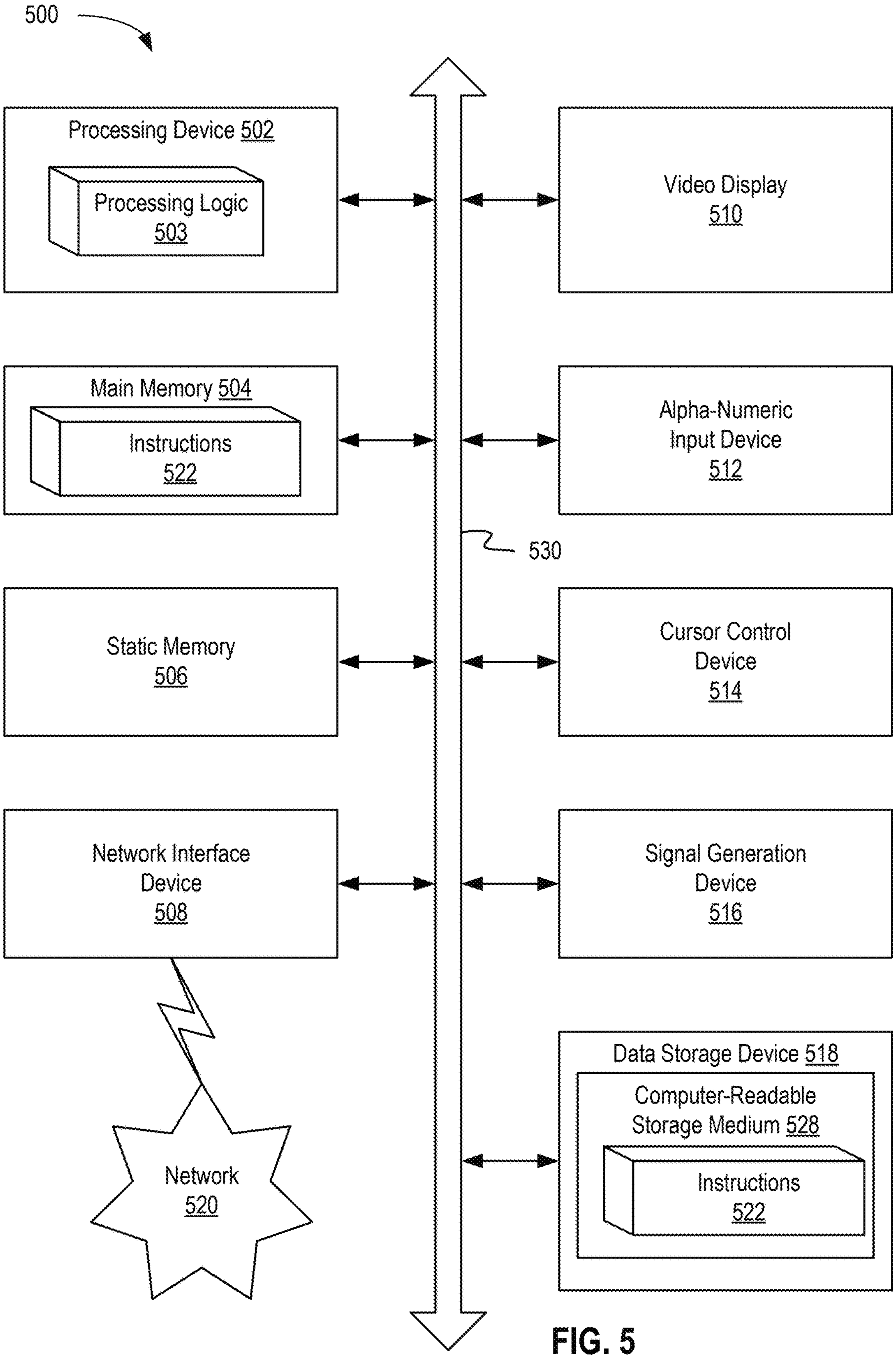
FIG. 5 depicts a block diagram of an example computer device capable of supporting virtual immersion sound experience and spatialization effects, according to at least one embodiment.

FIG. 5 depicts a block diagram of an example computer device 500 capable of supporting virtual immersion sound experience and spatialization effects, according to at least one embodiment. Example computer device 500 can be connected to other computer devices in a LAN, an intranet, an extranet, and/or the Internet. Computer device 500 can operate in the capacity of a server in a client-server network environment. Computer device 500 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 500 can include a processing device 502 (also referred to as a processor or CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which can communicate with each other via a bus 530.

Processing device 502 (which can include processing logic 503) represents one or more general-purpose processing devices such as a microprocessor, central processing unit, or the like. More particularly, processing device 502 can be a complex instruction set computing (CISC) microprocessor, reduced instruction set computing (RISC) microprocessor, very long instruction word (VLIW) microprocessor, processor implementing other instruction sets, or processors implementing a combination of instruction sets.

Processing device 502 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 502 can be configured to execute instructions executing method 400 of implementing virtual immersion sound experience and spatialization effects using an audio device with a low number of sound channels.

Example computer device 500 can further comprise a network interface device 508, which can be communicatively coupled to a network 520. Example computer device 500 can further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 can include a computer-readable storage medium (or, more specifically, a non-transitory computer-readable storage medium) 528 on which is stored one or more sets of executable instructions 522. In accordance with one or more aspects of the present disclosure, executable instructions 522 can comprise executable instructions executing method 400 of implementing virtual immersion sound experience and spatialization effects using an audio device with a low number of sound channels.

Executable instructions 522 can also reside, completely or at least partially, within main memory 504 and/or within processing device 502 during execution thereof by example computer device 500, main memory 504 and processing device 502 also constituting computer-readable storage media. Executable instructions 522 can further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

associating audio data of an audio stream transmitted over a plurality of input audio channels with a plurality of virtual speakers; and for each of a plurality of times:

identifying, using an optical sensor, a position of a user's head relative to the plurality of virtual speakers at a respective time of the plurality of times;

estimating, for the respective time and based at least on the identified position of the user's head, distances from each of the plurality of virtual speakers to one or more reference locations associated with the user's head;

determining, for the respective time and based at least on the estimated distances, a plurality of simulated sound intensities at the one or more reference locations associated with the position of the user's head, wherein the simulated sound intensities are associated with the plurality of virtual speakers; and generating, for the respective time and based on the plurality of simulated sound intensities, a plurality of output audio signals configured for a plurality of physical speakers.

2. The method of claim 1, wherein the plurality of input audio channels comprises a central input audio channel, one or more side input audio channels, and one or more surround input audio channels.

3. The method of claim 1, wherein at least one audio channel is associated with two or more speakers.

4. The method of claim 1, wherein the audio stream is associated with at least one of a music streaming application, a video streaming application, a gaming application, a virtual reality application, or an augmented reality application.

5. The method of claim 1, wherein identifying a position of the user's head comprises identifying a bounding box for the user's head.

6. The method of claim 1, wherein the optical sensor comprises at least one of a visible range camera or an infrared camera.

7. The method of claim 5, wherein identifying the bounding box comprises identifying one or more translational coordinates of the bounding box and one or more angles of rotation of the bounding box.

8. The method of claim 1, wherein identifying a position of the user's head comprises identifying locations of one or more facial features.

9. The method of claim 1, wherein determining the plurality of simulated sound intensities is further based on estimated directions from each of the plurality of virtual speakers to the one or more reference locations associated with the user's head.

10. The method of claim 1, wherein individual simulated sound intensities of the plurality of simulated sound intensities are determined for multiple acoustic frequencies.

11. The method of claim 1, wherein the physical speakers comprise the user's headphones.

12. The method of claim 1, wherein locations of the plurality of virtual speakers are user-adjustable.

13. The method of claim 1, wherein the one or more reference locations of the user's head comprise one or more locations of one or more of the user's ears estimated using the identified position of the user's head.

14. A system comprising:

one or more processing devices to:

associate audio data of an audio stream transmitted using a plurality of input audio channels with a plurality of virtual speakers; and for each of a plurality of times:

identify, using an optical sensor, a position of a user's head relative to the plurality of virtual speakers at a respective time of the plurality of times;

estimate, for the respective time and based at least on the identified position of the user's head, distances from each of the plurality of virtual speakers to one or more reference locations associated with the user's head;

determine, for the respective time and based at least on the estimated distances, a plurality of simulated sound intensities at the one or more reference locations associated with the user's head, wherein the simulated sound intensities are associated with the plurality of virtual speakers; and generate, for the respective time and based on the plurality of simulated sound intensities, a plurality of output audio signals configured for a plurality of physical speakers.

15. The system of claim 14, wherein the optical sensor comprises at least one of a visible range camera or an infrared camera.

16. The system of claim 14, wherein to identify a position of the user's head, the one or more processing devices are to identify at least one of:

a bounding box for the user's head; or locations of one or more facial features.

17. The system of claim 14, wherein to determine the plurality of simulated sound intensities, the one or more processing devices are further to estimate directions from each of the plurality of virtual speakers to the one or more reference locations associated with the user's head.

18. The system of claim 14, wherein the system comprises at least one of:

a system for performing simulation operations;

a system for performing digital twin operations;

a system for performing light transport simulation;

a system for performing collaborative content creation for 3D assets;

a system for performing deep learning operations;

a system for performing real-time streaming;

a system for generating at least one of virtual reality (VR) content, augmented reality (AR) content, or mixed reality (MR) content;

a system for presenting at least one of VR content, AR content, or MR content;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

19. A processor comprising one or more processing units to:

associate audio data of an audio stream transmitted using a plurality of input audio channels with a plurality of virtual speakers; and for each of a plurality of times:

identify, using an optical sensor, a position of a user's head relative to the plurality of virtual speakers at a respective time of the plurality of times;

estimate, for the respective time and based at least on the identified position of the user's head, distances from each of the plurality of virtual speakers to one or more reference locations associated with the user's head;

determine, for the respective time and based at least on the estimated distances, a plurality of simulated sound intensities at the one or more reference locations associated with the user's head, wherein the simulated sound intensities are associated with the plurality of virtual speakers; and generate, for the respective time and based on the plurality of simulated sound intensities, a plurality of output audio signals configured for a plurality of physical speakers.

* * * * *